United States Patent [19]
Theimer

[11] Patent Number: 5,359,390
[45] Date of Patent: Oct. 25, 1994

[54] APPARATUS FOR TRANSMISSIVE EXPOSURE OF COPY PAIRS

[75] Inventor: Siegfried R. Theimer, Birstein-Obersotzbach, Fed. Rep. of Germany

[73] Assignee: Siegfried Theimer Grafische Geraete GmbH, Birstein-Obersotzbach, Fed. Rep. of Germany

[21] Appl. No.: 961,928

[22] PCT Filed: May 26, 1992

[86] PCT No.: PCT/DE92/00452

§ 371 Date: Jan. 4, 1993

§ 102(e) Date: Jan. 4, 1993

[87] PCT Pub. No.: WO92/22011

PCT Pub. Date: Dec. 10, 1992

[30] Foreign Application Priority Data

May 29, 1991 [DE] Fed. Rep. of Germany ....... 4117548
Sep. 2, 1991 [DE] Fed. Rep. of Germany ....... 4129072

[51] Int. Cl.⁵ ............................................. G03B 27/04
[52] U.S. Cl. ............................................. 355/99
[58] Field of Search ................ 355/99, 97, 98, 103; 352/227; 353/95

[56] References Cited

U.S. PATENT DOCUMENTS 4,551,016 11/1985 Maher et al. ....................... 355/91
4,566,787 1/1986 Lüllau ................................. 355/100

FOREIGN PATENT DOCUMENTS 58763 9/1982 European Pat. Off. .
110940 6/1984 European Pat. Off. .
117294 9/1984 European Pat. Off. .
251416 3/1911 Fed. Rep. of Germany .
337198 5/1921 Fed. Rep. of Germany .
370565 3/1923 Fed. Rep. of Germany .
1522850 10/1969 Fed. Rep. of Germany .
2343270 9/1977 France .

Primary Examiner—Richard A. Wintercorn
Attorney, Agent, or Firm—Foley & Lardner

[57] ABSTRACT

The proposed apparatus for transmissive exposure of copy pairs has a pressure device 15, which presses the copy pairs being transmitted against the glass plate 11 and which comprises a plurality of pressure shoes 25 which are disposed side by side in the transverse direction, with a flat base surface 27 pressing the copy pairs against the glass plate, each pressure shoe being resiliently acted upon centrally from below and being not only height-adjustable but also tiltable about a longitudinal axis and a transverse axis.

10 Claims, 4 Drawing Sheets

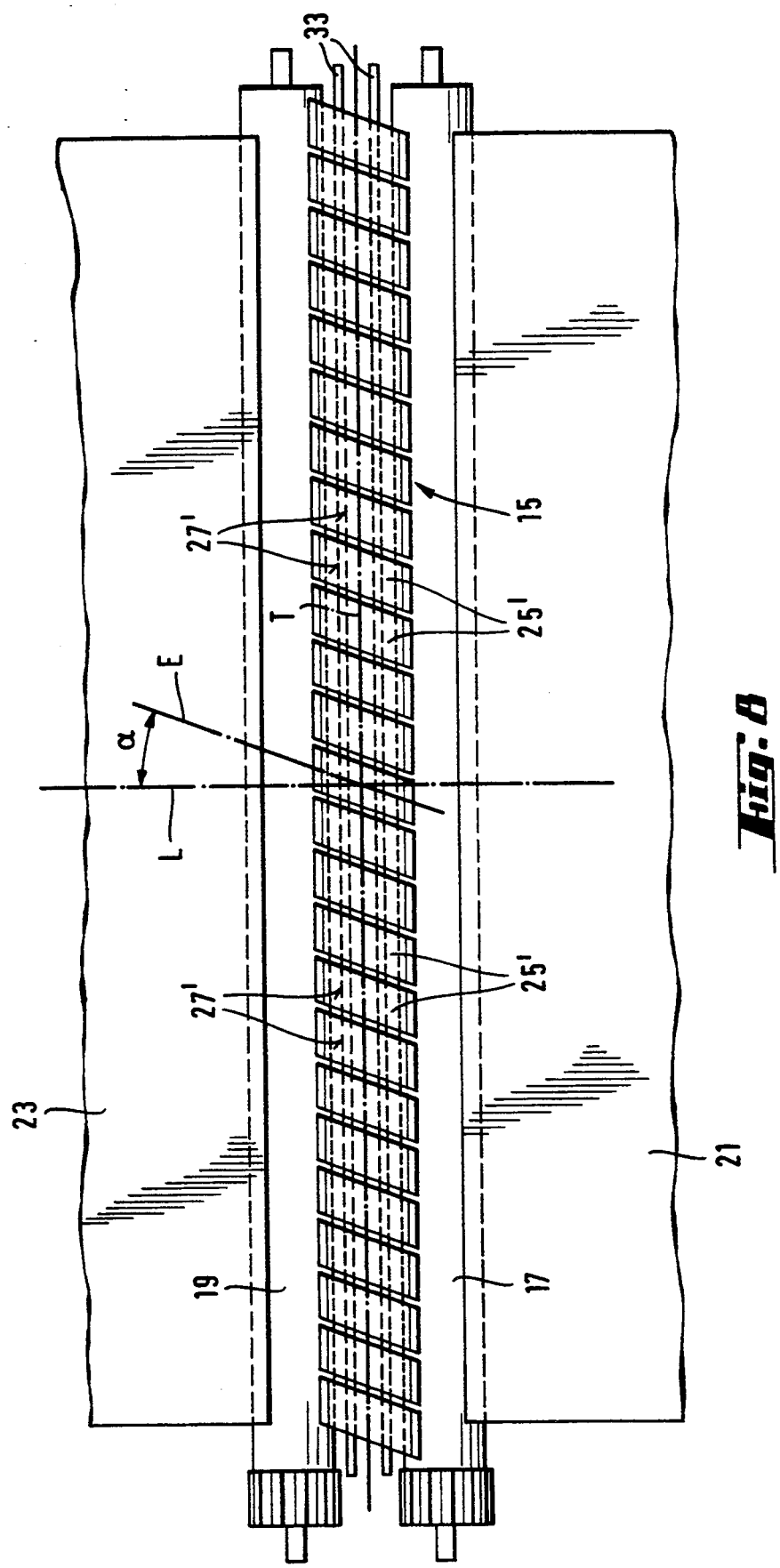

APPARATUS FOR TRANSMISSIVE EXPOSURE OF COPY PAIRS

The present invention relates to the transmissive exposure of copy pairs, and specifically, in particular, systems in which light-sensitive materials with copy originals laid on them are exposed during a through movement below or, in the case of upward exposure, above a light source. In the case of offset printing, the copy original is usually a photographic film and the light-sensitive material is an aluminum printing plate. In the case of the blueprint process, the copy original is, for example, a transparent drawing and the light-sensitive material is a blueprint paper or a blueprint foil. In the latter case, namely the use of transparent or light-transmitting blueprint foils, a plurality of the same can also be laid one on top of the other and exposed simultaneously. If, for example, three blueprint foils are to be exposed simultaneously, then, including the copy original, four material layers must be moved through the path of the light beam.

The invention proceeds from an apparatus for the transmissive exposure of copy pairs, having a light source directed onto a glass plate and a pressure device disposed on the other side of the glass plate, as well as a respective pair of transport rollers in front of and behind the transmission gap formed between the glass plate and the pressure device. Such an apparatus is known from EP-PS 0,117,294 B1.

The pressure device acts on the copy pairs in the course of transmission to the glass plate and is intended to cause these to be held in intimate contact during the exposure. If spacings remain as a result of included air pockets, then unsharpnesses designated as "hollow copies" are created.

In the known construction, the pressure device is a foam layer which rests on a rigid plate. At its lower surface, the upper end of a compression spring is supported, the lower end of which compression spring acts on a tie rod with settable force, which tie rod acts on the light source housing with the glass plate, so that the latter experiences, going beyond its weight, an additional surface pressure on the foam layer. A complete elimination of hollow copies is not achieved with this construction. This also applies to the further mentioned possibilities of the pressing-on by means of a multiplicity of closely disposed springs or of a cushion standing at excess pressure, with which in each instance a full-area pressing-on is to be achieved.

Similar considerations are also applicable to a construction which is known from EP-PS 0,110,940 B1 and in which the glass plate is pressed by means of a pressure-settable springing towards a bearing plate, over which the copy pairs are drawn in the course of the transmissive exposure.

DE-OS 1,522,850 further discloses a construction with upward exposure, in which a flat plate is pressed by resilient spring force downwards against the glass plate; in this case, the flat pressure plate carries a foam layer, which is provided with a brush covering, e.g. a velour layer. This construction also does not reliably prevent the occurrence of hollow copies.

The object of the present invention is the provision of an apparatus for transmissive exposure, with which an improved quality of the copying result is achieved and the occurrence of hollow copies is reliably prevented.

Proceeding from the initially considered construction, the achievement of the set object takes place, according to the invention, in that the pressure device comprises a plurality of pressure shoes which are disposed side by side in the transverse direction and which are pressed in the height direction by resilient spring force towards the glass plate, with a flat base surface, which are tiltable about the longitudinal axis and transverse axis.

As a result of the division, according to the invention, of the pressure zone into a multiplicity of pressure surfaces, which are displaceable in the direction of pressing-on and thus exhibit two tilting degrees of freedom, i.e. virtually a cardan joint, which pressure surfaces are in this case rigid in themselves, in spite of dispensing with a surface pressing which is entirely continuous in the transverse direction, there is successfully provided the assurance of an intimate contact of the copy pairs during their transmission through the exposure region on this entire surface.

Expedient further developments of the invention are indicated in the subclaims.

In claim 2, it is indicated how, in a manner which is simple from the point of view of design, the pressure shoes can be designed, with the ability to be simultaneously pressed down by resilient spring force, to be mounted tiltably about the longitudinal axis and the transverse axis, i.e. virtually with a cardan joint.

A further refinement of the invention resides in an oblique setting of the pressure shoes according to claims 3 and 4, in such a manner that the unavoidable gaps remaining between these are at an angle to the longitudinal direction or direction of transmission. With such a design, no position of the copy pairs remains without supporting contact with the base surfaces of the pressure shoes for longer than just a short period of time, namely during a crossing of a gap. This design is to be preferred especially where the two copy pairs are foils or papers which are thin and have very little resistance to bending.

Furthermore, the design of the base surfaces themselves is expediently dependent upon the nature of the processed material. In any event, according to claim 7, the base surface should exhibit a slip coating, i.e. a coating with the lowest possible coefficient of friction in cooperation with the lower surface of the light-sensitive material. If the latter is an aluminum pressure plate, then the provision—which is proposed according to claim 8 and which is known per se—with a bristle surface is expedient. Especially advantageous is a flocking with short nylon bristles having a length of approximately 0.8 mm.

If, for example in the case of the blueprint process, the light-sensitive material is a foil or the like, the enamel coating proposed in claim 9 is expedient. In general, it may be stated that in the selection of the surfaces sliding relative to one another in each instance a particularly smooth surface such as that of the aluminum plate is to cooperate with a matt or rougher, possibly brush-type surface of the pressure shoes, and matt and thus somewhat rougher photographic materials are expediently paired with smooth and hard surfaces of the pressure shoes.

The proposed transmissive exposure system proves to be particularly useful in the production of large-format blueprints. In, for example, the motor vehicle industry, or town planning, blueprints having a length of 6 m or more are required. In this case, the proposed design achieves not only a high copy quality with the avoidance of regions of unsharpness and hollow copies, but also the greatest accuracy to size and freedom from distortion. This even applies in the production of multiple blueprints in one pass, for example in the case of the exposure of two or more blueprint foils laid one on top of the other.

The invention is further explained hereinbelow by the description of illustrative embodiments with reference to the accompanying drawings. In the drawings:

FIG. 1 diagrammatically shows a transmissive exposure machine in a side elevation, partially cutaway;

FIG. 8 shows the top plan view, similar to that in FIG. 3, onto a design with pressure shoes extending at an angle to the direction of transmission.

Figure 1:
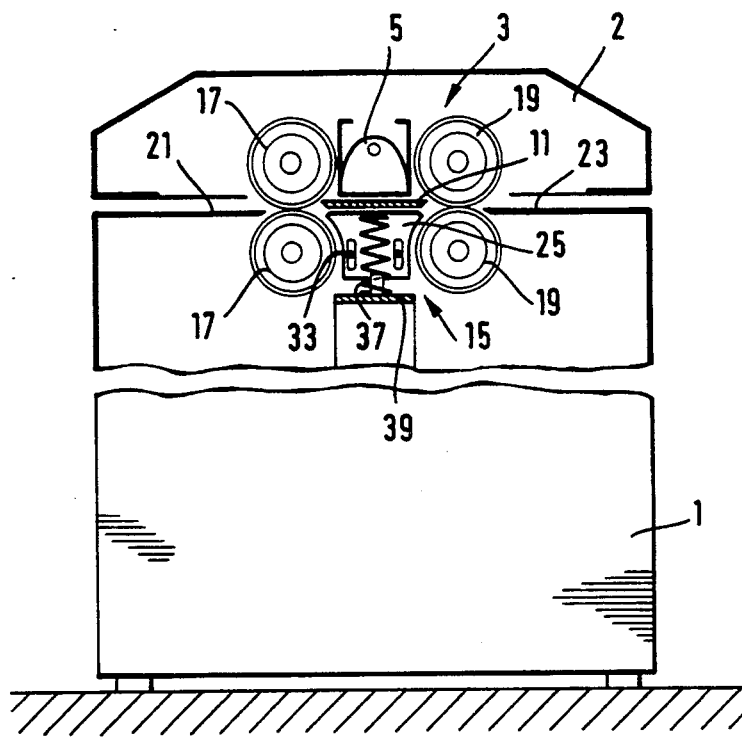

The transmissive exposure unit designated as a whole by 3 is incorporated in a support housing 1 with a cover 2 which can be raised or swung up. Said unit includes a light source 5 which is incorporated in the cover 2, with a glass plate 11 which represents the lower boundary thereof. The light source itself comprises a radiator 7 with a reflector 9.

At part of the transmissive exposure unit which is incorporated in the support housing 1 is essentially a pressure device 15, which forms, between it and the glass plate 11, the transmission gap for the copy pairs. A pair of entrance-side transport rollers 17 is disposed in front of the transmission gap, and a pair of exit-side transport rollers 19 is disposed behind the transmission gap. The respectively upper roller of these pairs belongs to that part of the unit which is incorporated in the cover.

Again, in front of and behind these there is disposed an entrance-side stage surface 21 and an exit-side stage surface 23. If required, an antistatic brush strip is disposed behind the upper roller of the exit-side pair of transport rollers 19, said brush strip being intended to wipe off any possible static charges.

The pressure device 15 comprises a number of pressure shoes 25 which are situated side by side in the transverse direction. Each pressure shoe has a substantially U-shaped cross section with a flat base surface 27, from the lateral edges of which side cheeks 29 are bent away at right angles. In these there are formed in each instance two elongate holes 31, which extend in the height direction and through which guide rods 33 engage. This guidance leaves to the pressure shoes the possibility of displacement in the height direction as well as a possibility of tilting about the longitudinal axis L and, to a sufficient extent, about the transverse axis T (transversal axis).

The front and the rear edge of the base surface 27 merge, rounded off, into a short bent-away portion, which forms a run-up ramp 35.

With each pressure shoe 25 there is associated a pressure spring 37, the upper end of which acts on the center of the lower surface of the base surface 27. The spring sits between the guide rods 23 and its lower end is supported on a spring counterbearing 39, which is height-adjustable in a suitable manner, so that the spring force can be set.

In the described manner, the entire pressure zone is divided into a plurality of pressure surfaces situated side by side in the form of the base surfaces of the pressure shoes. With only small spacings there lie side by side in the transverse direction flat partial surfaces, which with reliably equal force press the exposure material being transmitted towards the glass plate; this results in a very high copy quality and reliably prevents hollow copies.

Figure 2:
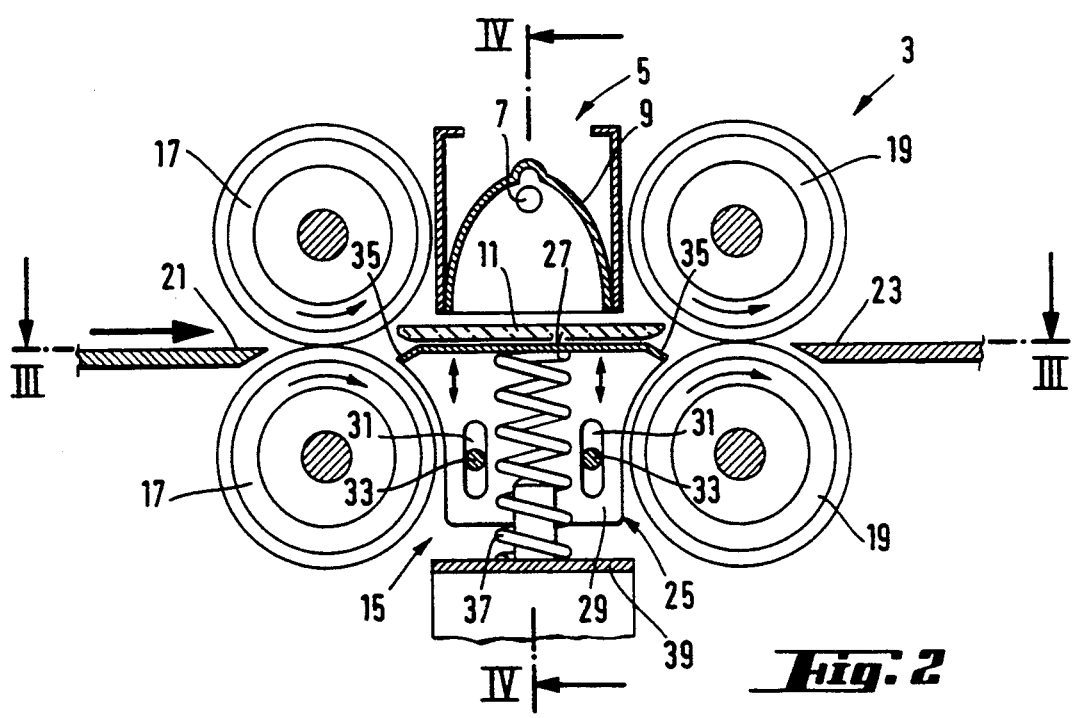
FIG. 2 shows the transmissive exposure unit in an enlarged representation.
Figure 3:
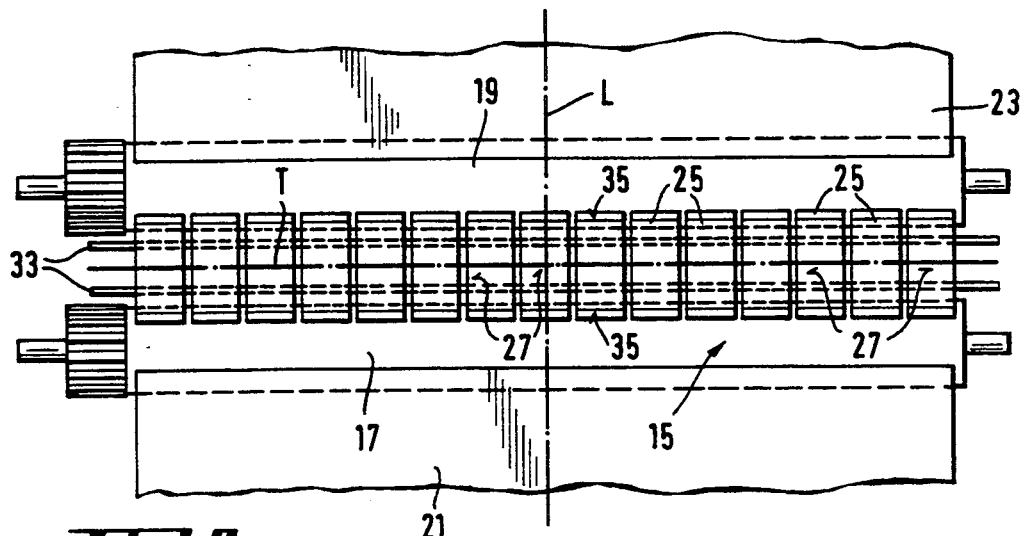
FIG. 3 shows the top plan view according to the section line III—III of FIG. 2.
Figure 4:
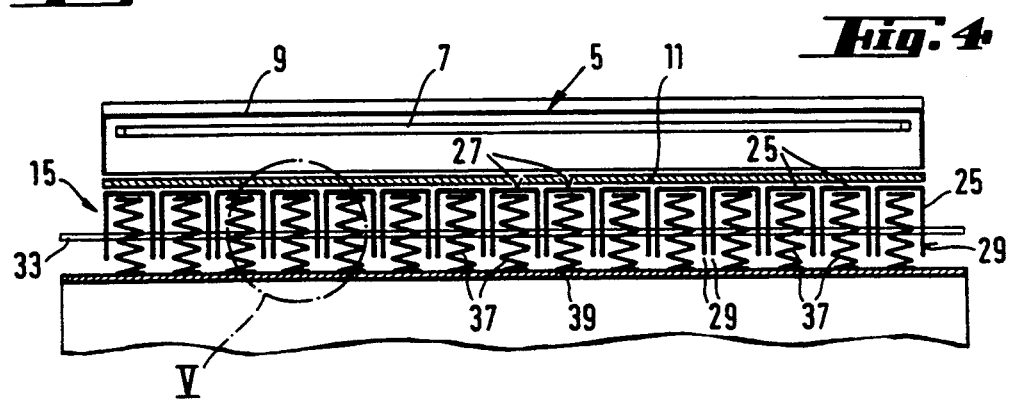
FIG. 4 shows the cross section according to line IV—IV from FIG. 2.
Figure 5:
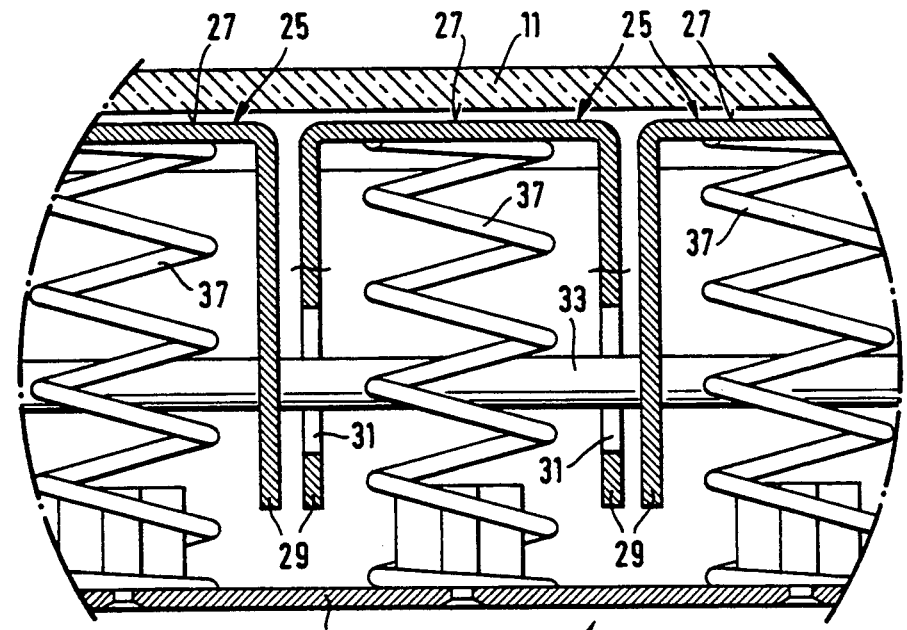
FIG. 5 shows an enlarged representation of the detail V—V from FIG. 4.
Figure 6:
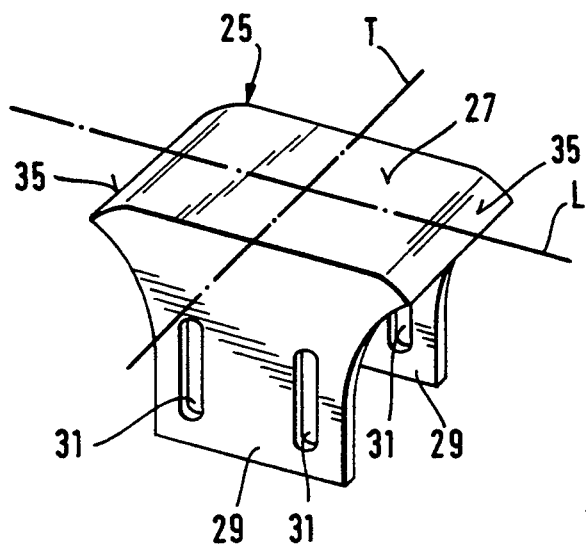
FIG. 6 shows a perspective view of a pressure shoe.
Figure 7:
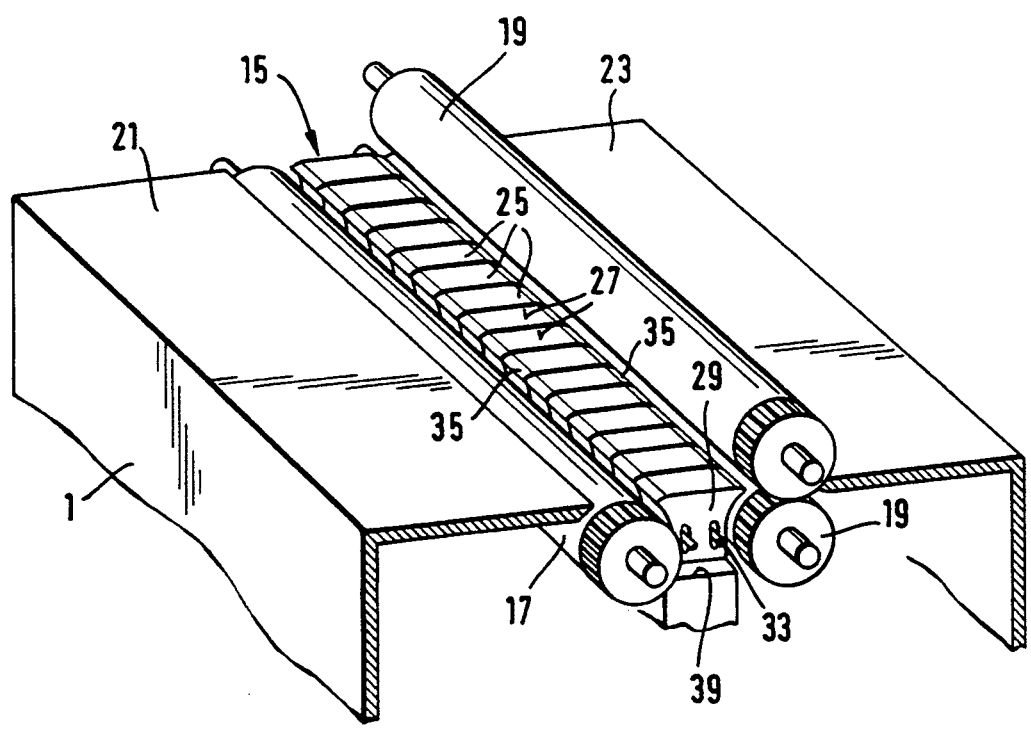
FIG. 7 shows a perspective view of the transmissive exposure unit in the case of the removal of the illumination device and of one of the upper transport rollers.

In the embodiment shown in FIGS. 1 to 7, the base surfaces 27 are substantially rectangular and the unavoidable gaps between them extend in the longitudinal direction L, i.e. in the direction of transmission of the copy pairs. In the case of copy pairs with a certain rigidity, especially if the material to be exposed comprises printing plates composed of thin aluminum sheets, this in no way impairs the high copy quality achieved.

However, in the case of copy pairs which are thin and thus have very little resistance to bending, there may be a certain striation in the region of the gaps between adjacent pressure shoes. The cause of this may be that the intensive contact of the copy pairs does not indeed remain fully maintained in the gap region. Another reason may reside in the differing light reflection in the gap regions on the one hand and in the region of the base surfaces on the other hand. This has an effect where the light-sensitive copy pair to be exposed is also light-transmitting, as is the case with light-sensitive foils. In these cases, a part of the light flux passes through the two copy pairs and is reflected by the base surfaces of the pressure shoes. It is possible to reduce this effect by blackening the base surfaces, in order to create a light absorption which is as complete as possible. Nevertheless, a remaining part of reflective light may lead to rather different exposure conditions as compared with the gap regions. In the event of conformity of the gap direction or transmission direction of the copy pairs, this may become evident in the form of a striation.

A complete suppression even of these effects is achieved with the design shown in FIG. 8, in which the pressure shoes 25' have parallelogram-shaped base surfaces 27', in such a manner that their reach E extends at an angle $\alpha$ of preferably approximately 20° to the longitudinal direction L indicating the direction of transmission. With such a division of the total pressure surface, there are no positions of the copy pairs which remain for a relatively great length of time in the region of a gap between adjacent pressure shoes. The fraction of the exposure time during which this takes place for certain regions has no effect.

If the geometry of the parallelogram is selected so that the shorter connecting line between two diametrically opposite corners subdivides this parallelogram into two equal right-angled triangles and extends in the longitudinal direction L, and each surface point of the copy pairs will cross one gap once in the course of transmission. This creates equality, for each point, of the ratio between the times during which it is crossing a gap and during which it is sliding, with physical support, on a base surface. This gives quite uniform pressure and exposure conditions in the transverse direction over the width.

I claim:

1. Apparatus for transmissive exposure of copy pairs, having a light source (5) directed onto a glass plate (11) and a pressure device (15), which is disposed on the other side of the glass plate (11) and which is immovable in the direction of transmission as well as a respective pair of transport rollers (17, 19) in front of and behind the transmission gap formed between glass plate (11) and pressure device (15), to push the copy pairs through the transmission gap, characterized in that the pressure device (15) comprises a plurality of pressure shoes (25) which are disposed side by side in the transverse direction and which are pressed in the height direction by resilient spring force towards the glass plate (11), with a flat base surface (27), which are tiltable about an axis extending in the longitudinal direction (L) and an axis extending in the transverse direction (T).

2. Apparatus for transmissive exposure according to claim 1, characterized in that each pressure shoe (25) exhibits a substantially U-shaped cross section, the limbs of which are side cheeks (29) angled off from the lateral edges of the base surface (27) and in which in each instance two elongate holes (31) extending in the height direction are formed for the passage of guide rods (33), the center of the lower surface of the base surface (27) being acted upon by a pressure spring (37).

3. Apparatus according to claim 1 characterized in that the direction (E) of the reach of the base surfaces (27') includes an angle (α) with the direction of transmission (L) of the copy pairs.

4. Apparatus according to claim 3, characterized in that the base surface (27') has a parallelogram shape, the long sides extending in the direction of the reach (E) and the short sides extending in the transverse direction (T).

5. Apparatus according to claim 1, characterized in that at least the front edge of the base surface (27) of each pressure shoe (25) is bent over kink-free to form a run-up ramp (35).

6. Apparatus according to claim 1, characterized in that the counterbearings (39) supporting the lower ends of the springs (37) are displaceable in the height direction to set the spring force.

7. Apparatus according to claim 1, characterized by a slip coating of the base surfaces (27) of the pressure shoes (25).

8. Apparatus according to claim 7, characterized by a flocking of the base surfaces (27) with bristles of natural or synthetic fibers.

9. Apparatus according to claim 7, characterized by an enamel coating of the base surfaces (27).

10. Apparatus according to claim 1, characterized in that the base surface (27) of the pressure shoes (25) is blackened.

* * * * *